United States Patent
Ryan et al.

(10) Patent No.: US 7,818,730 B1
(45) Date of Patent: Oct. 19, 2010

(54) AUTOMATIC MINIMAL BUILD DEPENDENCY DETERMINATION AND BUILDING AN EXECUTABLE WITH SOURCE CODE

(75) Inventors: Anthony Robert Ryan, Groton, MA (US); James Carrick, Natick, MA (US)

(73) Assignee: The Math Works, Inc., Natick, MA (US)

( * ) Notice: Subject to any disclaimer, the term of this patent is extended or adjusted under 35 U.S.C. 154(b) by 1089 days.

(21) Appl. No.: 11/479,002

(22) Filed: Jun. 30, 2006

(51) Int. Cl.
*G06F 9/45* (2006.01)
*G06F 9/44* (2006.01)

(52) U.S. Cl. .................. 717/140; 717/148; 717/150
(58) Field of Classification Search .......... 717/140–150
See application file for complete search history.

(56) References Cited

U.S. PATENT DOCUMENTS

| | | | | |
|---|---|---|---|---|
| 5,325,531 | A * | 6/1994 | McKeeman et al. | 717/145 |
| 5,414,855 | A * | 5/1995 | West | 717/158 |
| 5,446,899 | A * | 8/1995 | Brett | 717/145 |
| 5,493,675 | A * | 2/1996 | Faiman et al. | 717/151 |
| 5,524,244 | A * | 6/1996 | Robinson et al. | 717/140 |
| 5,535,392 | A * | 7/1996 | Brett | 717/145 |
| 5,613,117 | A * | 3/1997 | Davidson et al. | 717/144 |
| 5,628,016 | A * | 5/1997 | Kukol | 717/140 |
| 5,659,753 | A * | 8/1997 | Murphy et al. | 717/147 |
| 5,715,460 | A * | 2/1998 | Acker et al. | 717/140 |
| 5,909,580 | A * | 6/1999 | Crelier et al. | 717/141 |
| 6,002,873 | A * | 12/1999 | Carter et al. | 717/142 |
| 6,721,943 | B2 * | 4/2004 | Krishnaiyer et al. | 717/150 |
| 6,976,248 | B2 * | 12/2005 | Balassanian | 717/148 |
| 6,986,130 | B1 * | 1/2006 | Boucher | 717/151 |
| 6,986,131 | B2 * | 1/2006 | Thompson et al. | 717/160 |
| 7,082,600 | B1 * | 7/2006 | Rau et al. | 717/148 |
| 7,200,840 | B2 * | 4/2007 | Gschwind et al. | 717/147 |
| 7,290,252 | B2 * | 10/2007 | Diedrich et al. | 717/145 |

(Continued)

OTHER PUBLICATIONS

Rao et al, "Compiled query execution engine using JVM", IEEE ICDE, pp. 1-12, 2006.*
Rouson et al, "Design patterns for multiphysics modeling in Fortran 2003 and C ++", ACM Trans. on Math. Software, vol. 37, No. 1, article 3, pp. 1-30, 2010.*
Pan et al, "PEAK—A fast and effective performance tuning system via compiler optimization orchestration", ACM Trans. on Prog. Lang. & Sys. vo. 30, No. 3, article 17, pp. 1-43, 2008.*

(Continued)

*Primary Examiner*—Anil Khatri
(74) *Attorney, Agent, or Firm*—Lahive & Cockfield, LLP; Kevin J. Canning (57) ABSTRACT

The present invention provides a method and system for building an executable using only the necessary source modules or a reduced set of source modules. The complete list of necessary source modules can be determined by checking for dependency of any already identified necessary source modules. Hence, if any of the source modules belongs to a library, the entire library will not need to be compiled in order to use any necessary source module to build the executable. The present invention has the advantage that the executable takes shorter time to build and the executable is smaller in memory size so that it is easier to be ported to a target system. The present invention may also be used to minimize or reduce the memory needed to load a model so that only the elements/blocks that are used in the model are loaded into memory when a model loads. The present invention may further be used to minimize or reduce efforts in validating a model by creating a new library containing only the library elements/blocks that are used in the model, so that it is easy to identify which library elements/blocks need to be validated.

35 Claims, 4 Drawing Sheets

U.S. PATENT DOCUMENTS 7,313,785 B2 * 12/2007 Van Gennip et al. ........ 717/130
7,389,499 B2 * 6/2008 Donovan et al. ............ 717/143
7,395,523 B2 * 7/2008 Bates et al. ................. 717/112
7,712,090 B2 * 5/2010 Stuefe ........................ 717/149

OTHER PUBLICATIONS

Leavens et al, "Preliminary design of JML a behavioral interface specification language for Java", ACM SIGSOFT, vol. 31, No. 3, pp. 1-38, 2006.*

* cited by examiner

AUTOMATIC MINIMAL BUILD DEPENDENCY DETERMINATION AND BUILDING AN EXECUTABLE WITH SOURCE CODE

TECHNICAL FIELD

The present application relates to selectively processing and/or loading source modules from a collection of source modules based on their usage.

BACKGROUND OF THE INVENTION

MATLAB® is a product of The MathWorks, Inc. of Natick, Mass., that provides engineers, scientists, mathematicians, educators, and others across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, including, for example, image processing, and graphics in an easy-to-use environment where problems and solutions are expressed in familiar mathematical notation, without traditional programming. MATLAB® is used to solve and/or analyze complex engineering and scientific problems by developing mathematical models of the problem. A model is designed, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming language with static typing such as Fortran or C.

Besides using a textual modeling environment, such as MATLAB®, graphical modeling environments, such as Simulink® from The MathWorks, Inc. of Natick, Mass., can also be used to create a model. Graphical models such as block diagrams, are commonly used to represent a design, or algorithm, of an implementation for computational hardware or wetware, for example, an implementation given in software. One or more block diagrams may in their entirety or partially represent a design for a target hardware platform. A target hardware platform used in this application may include a single computational hardware component or multiple computational hardware components that can be of different types. A target hardware platform may also have other elements such as memory, interfaces, and other integrated circuits (ICs). A computational hardware component is used to mean any hardware component with computational capability, such as a digital signal processor (DSP), general-purpose processor (GPP), graphics processing unit (GPU), microcontroller, application specific integrated circuit (ASIC), application-specific instruction-set processor (ASH)), field-programmable gate array (FPGA), biocomputer, quantum computer, and the like.

An automatic code generation application can automatically generate code and build programs from the textual model or graphical model for implementation on the computational platform based on the design. Typically, when code is automatically generated, large library files (.lib files) or object (.obj) files from the libraries are linked to the automatically generated code. Before linking can occur, the entire library must be compiled. Each of the libraries can contain hundreds or thousands of source modules, most of which may not be used by the automatically generated code. However, in the prior art, even though only one source module from the library is needed to build a model, the entire library needs to be compiled, which can be time consuming. Additionally, if the automatically generated code is to be ported to a different platform without code changes, all of the source files for all of the libraries must be ported to the new environment and recompiled. The time to recompile all the source files can also be time consuming especially the target system usually does not have as much computational power as the host computer that simulates the model and generates code from the model.

SUMMARY OF THE INVENTION

The present invention provides a method and system for building an executable using only the necessary source modules or a reduced set of source modules. Hence, minimal source modules can be compiled and later transferred when the executable needs to be ported to a target system. Additionally, using only the necessary source modules or a reduced set of source modules to build an executable also minimizes or reduces the compilation time and validation efforts. The present invention also provides a method and system for determining the necessary (minimal) source modules needed to build the executable. The present invention may also be used to minimize or reduce the memory needed to load a model so that only the elements/blocks that are used in the model are loaded into memory when a model loads. The present invention may further be used to minimize or reduce efforts in validating a model by creating a new library containing only the library elements/blocks that are used in the model, so that it is easy to identify which library elements/blocks need to be validated.

In one embodiment of the present invention, a computer-implemented method for building an executable using a set of source modules is provided. The method includes the step of obtaining a first source module, the first source module is one of a plurality of necessary source modules to be used to build an executable, at least one of the plurality of necessary source modules is part of a collection of source modules including at least one unnecessary source module that is not used in the executable. The collection of source modules may be a library. The method also includes the step of building the executable using the plurality of necessary source modules without processing the at least one unnecessary source module. Building the executable may include compiling the plurality of necessary source modules without compiling the at least one unnecessary source module in the collection of source modules.

In one aspect of the present invention, the method further includes the step of identifying the plurality of necessary source modules. The method may also further include the step of creating a list including at least one identified source module that is one of the plurality of necessary source modules. In a further aspect of the present invention, the list may include the first source module. In another aspect of the present invention, the method may include the steps of identifying that the first source module depends on a second source module that is not in the list and adding the second source module to the list. In yet another aspect of the present invention, the method may include the step of determining if the list includes all of the plurality of necessary source modules to build the executable. The method may further determine if any of the source modules in the list depends on a source module that is not in the list. The method may determine that the list is missing at least one source module and search for the at least one missing source module in the collection of source modules. The method would then add the at least one missing source module to the list. The method may also further build the executable using the at least one missing source module. In still another aspect of the present invention, the executable is an .exe file. The method may further include the step of porting the executable to a target system. In yet another aspect of the present invention, the first source module is a piece of code that is automatically generated. The first source module may be a file that is written in the C programming language, JAVA™ programming language, Ada programming language, Fortran programming language, SystemC programming language, Verilog hardware description language, Python programming language, or other programming language.

In another embodiment of the present invention, a computer-implemented method for building an executable using a minimal set of source modules is provided. The method includes obtaining a first source file, the first source file is one of a plurality of necessary source files to be used to build an executable, at least one of the plurality of necessary source files is from a library including at least one unnecessary source file that is not used in the executable and creating the executable using the plurality of necessary source files without the at least one unnecessary source file that is not used in the executable.

In one aspect of the present invention, the method may further create a list including the first source file. The method may also compile all source files in the list, wherein the list does not include a second source file that the first source file depends on. The method may create one or more object files and link the one or more object files. In a further aspect of the present invention, the method may identify an unresolved symbol. The method may also search for the unresolved symbol in the library and identifying the second source file corresponding to the unresolved symbol, wherein the second source file is one of the files in the library. The second source file is then added to the list. The second source file is compiled to create a second object file and the second object file is linked with at least one of the one or more object files.

In yet another embodiment of the present invention, a storage medium storing computer executable instructions for causing a computing device to build an executable using a minimal/reduced set of source modules is provided. The instructions include the instructions for obtaining a first source module, the first source module is one of a plurality of necessary source modules to be used to build an executable, at least one of the plurality of necessary source modules is part of a collection of source modules including at least one unnecessary source module that is not used in the executable and building the executable using the plurality of necessary source modules without processing the at least one unnecessary source module.

In still another embodiment of the present invention, a storage medium storing computer-executable instruction for causing a computing device to build an executable using a minimal/reduced set of source modules is provided. The instructions include the instructions for obtaining a first source file, the first source file is one of a plurality of necessary source files to be used to build an executable, at least one of the plurality of necessary source files is from a library including at least one unnecessary source file that is not used in the executable and creating the executable using the plurality of necessary source files without the at least one unnecessary source file that is not used in the executable.

In yet another embodiment of the present invention, a system for building an executable using a minimal/reduced set of source modules is provided. The system includes a build tool for building the executable and a minimal source tool for determining a plurality of necessary source modules to build the executable. The system also includes a collection of source modules storing at least one of the plurality of necessary source modules.

In still another embodiment of the present invention, a computer implemented method for using minimal/reduced memory for loading a model is provided. The method includes receiving an instruction for loading a model, identifying a plurality of elements, such as blocks, that are used in the model, searching in at least one library for the plurality of elements, the at least one library includes at least one element that is not used in the model, and loading the plurality of elements into memory without loading all elements from the at least one library.

In yet another embodiment of the present invention, a computer-implemented method for performing validation for a model is provided. The method includes obtaining a model, identifying a plurality of elements, such as blocks, that are used in the model, searching in at least one library for the plurality of elements, the at least one library including at least one element that is not used in the model, creating a new library containing the plurality of elements without the at least one element that is not used in the model, and validating the model using the new library.

In still another embodiment of the present invention, a computer-implemented method to distribute a plurality of instructions to a remote computing device is provided. The method includes receiving a request from the remote computing device for the plurality of instructions and forwarding the plurality of instructions to the remote computing device. The plurality of instructions include instructions for obtaining a first source module, the first source module is one of a plurality of necessary source modules to be used to build an executable, at least one of the plurality of necessary source modules is part of a collection of source modules including at least one unnecessary source module that is not used in the executable; and building the executable using the plurality of necessary source modules without processing the at least one unnecessary source module.

In yet another embodiment of the present invention, a computer-implemented method for building an executable using a set of source modules is provided. The method includes obtaining a first source module and a second source module to build an executable; failing to resolve an unresolved symbol by linking the first source module and the second source module; automatically searching for a third source module that resolves the unresolved symbol; and linking at least one of the first source module and the second source module to the third source module.

In one aspect of the present invention, the third source module is a part of a library that has a fourth source module that is not necessary to build the executable. In another aspect of the present invention, a part of the library is not compiled and the method further includes compiling the third source module without compiling the fourth source module. In a further aspect of the present invention, the method further includes successfully creating the executable without compiling the fourth source module in the library.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

The present invention provides a method and system for building an executable using only the necessary source modules or a reduced set of source modules. A source module is used herein to refer to a code section, manually written or automatically generated, such as binary data, a binary source file, a C source file, a JAVA™ source file, a piece of code representing an element in a graphical model, pre-compiled object files (.obj files) in the absence of the original code sections. A necessary source module is a module that has at least a function or a feature that is used by the eventual executable. In other words, the executable cannot be built without the necessary source module. As used herein, "building an executable" means creating an executable by combining multiple source modules and processing these source modules, such as compiling and/or linking, so that they work together to form an executable. An executable can be, but is not limited to, a wholly or partially self-contained application (.exe file or a JAVA™ .class file), a shared library such as a Dynamically Linked Library (DLL), a JAVA™ archive (.jar), optionally with a default entry point (an JAVA™ class in the archive), a JAVA™ class with an entry point (static main method), or a runnable graphical model, for example for computational simulation, a runnable binary image that can be run on a target hardware system. The executable can be run on its own or with the assistance of shared libraries such as the dynamically linked libraries (DLLs) under the Microsoft® Windows® operating systems, or using a virtual machine such as the JAVA™ virtual machine. The build process can include compiling the source modules and linking the object codes that are created from the source modules. The complete list of necessary source modules can be determined by checking for dependency of any already identified necessary source modules. Hence, if any of the source modules belongs to a library, the entire library will not need to be compiled or loaded in memory before the necessary source modules can be used to build the executable. The present invention has the advantage that the executable takes shorter time to build and the executable is smaller in memory size so that it is easier to be ported to a target system.

The following illustrative embodiments will be described for illustrative purposes relative to a MATLAB®-based technical computing environment. Although the illustrative embodiment will be described relative to a MATLAB®-based application, one of ordinary skill in the art will appreciate that the present invention may be applied to technical computing or modeling tasks with other technical computing or modeling environments or programming and software engineering tasks in general. Examples of technical computing and modeling environments that are suitable to practice with the present invention include ones from software products of LabVIEW® or MATRIXx from National Instruments, Inc., Mathematica® from Wolfram Research, Inc., Mathcad of Mathsoft Engineering & Education Inc., Maple™ from Maplesoft, a division of Waterloo Maple Inc. or Rhapsody from I-Logix Inc., TargetLink and Real-Time Interface from dSPACE GmbH, RT-LABT™ from Opal-RT Technologies, Inc., EXITE from EXTESSY AG, SystemVue™ from Eagleware-Elanix Corporation, COSSAP from Synopsys, Inc., HyperSignal® from Hyperception, Inc., Scilab from INRIA (Institut national de recherche en informatique et en automatique), or Dymola from Dynasim AB.

Figure 1:
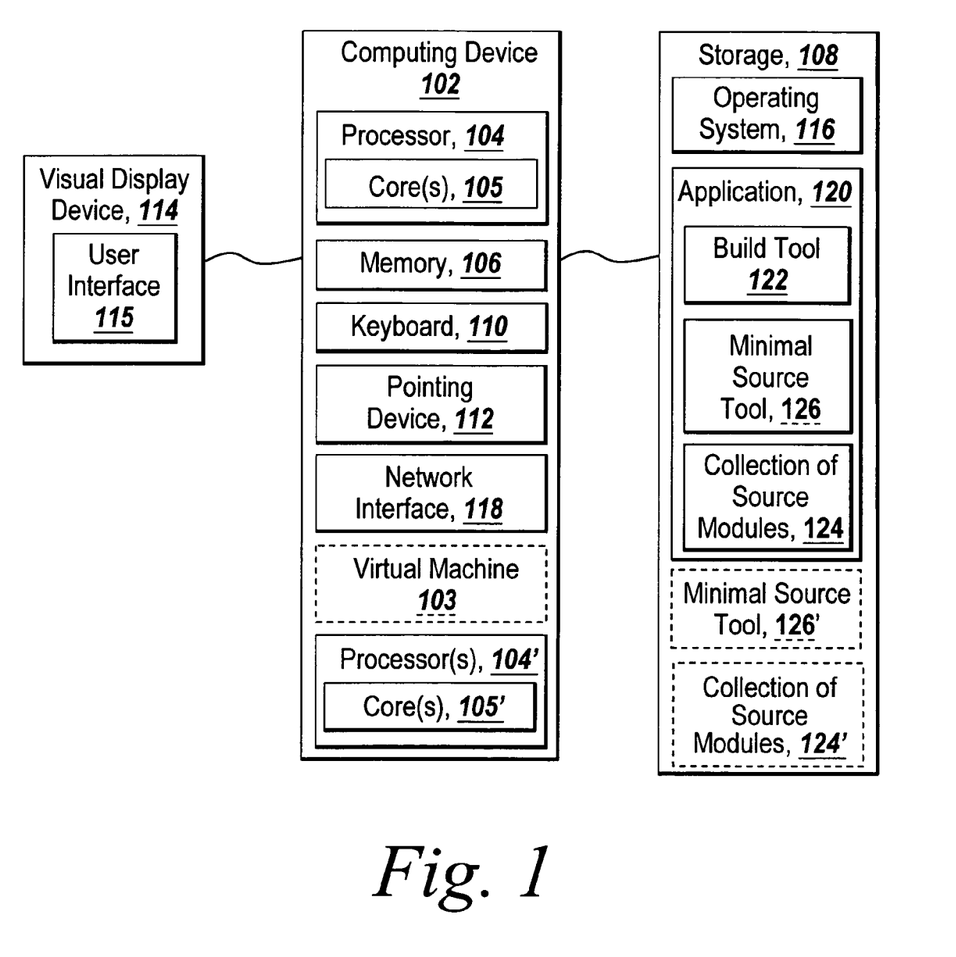
FIG. 1 is a block diagram of a computing device suitable for practicing an embodiment of the present invention.

FIG. 1 depicts an environment suitable for practicing an illustrative embodiment of the present invention. The environment includes a computing device 102 having memory 106, on which software according to one embodiment of the present invention may be stored, processor 104, and optionally, one or more processor(s) 104' for executing software stored in the memory 106, and other programs for controlling system hardware. Processor 104 and processor(s) 104' can each be a single or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing resources, such as FPGA, ASIC, ASIP, DSP, GPU, and GPP, may also be used for executing code and/or software. A hardware accelerator can additionally be used to speed up the general processing rate of the computing device 102.

The memory 106 may comprise a computer system memory or random access memory such as DRAM, SRAM, EDO RAM, Flash, etc. The memory 106 may comprise other types of memory as well, or combinations thereof. A user may interact with the computing device 102 through a visual display device 114 such as a computer monitor, which may include a user interface 115. The computing device 102 may include other I/O devices such as a microphone, a camera, a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage medium 108, such as a hard-drive, CD-ROM, or other computer readable media, for storing an operating system 116 and other related software, and for storing application 120, such as MATLAB®. A storage medium can further be a device with hard-wired configuration for performing a specific function/application, such as a FPGA, where the executable instructions are hard-wired into the device. Application 120 includes a build tool 122, such as a compiler, that can be used to build a software project, such as an executable. Application 120 may also include minimal source tool 126 and collection of source modules 124. Minimal source tool 126 is able to determine what the necessary (minimal) source modules are that are required to build a particular executable. One or more of the necessary source modules can be stored in a collection of source modules 124 or collection of source modules 124'. One of ordinary skill in the art will appreciate that minimal source tool 126 can be adapted to be included as part of the application 120 or part of build tool 122, or it can be a stand-alone application, module, script, or program that responds to calls from the application 120, such as minimal source tool 126'. One of ordinary skill in the art will also appreciate that collection of source modules 124, such as a library, can be adapted to be included as part of the application 120, or it can reside somewhere else in storage 108, such as collection of source modules 124'. Additionally, there can be multiple collection of source modules in the application 120 or/and elsewhere in storage 108.

Additionally, the computing device 102 may include a network interface 118 to interface to a Local Area Network (LAN), Wide Area Network (WAN), Controller Area Network (CAN), Firewire, Flexray, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, notebook, tablet PC, personal digital assistant, mobile telephone, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 2:
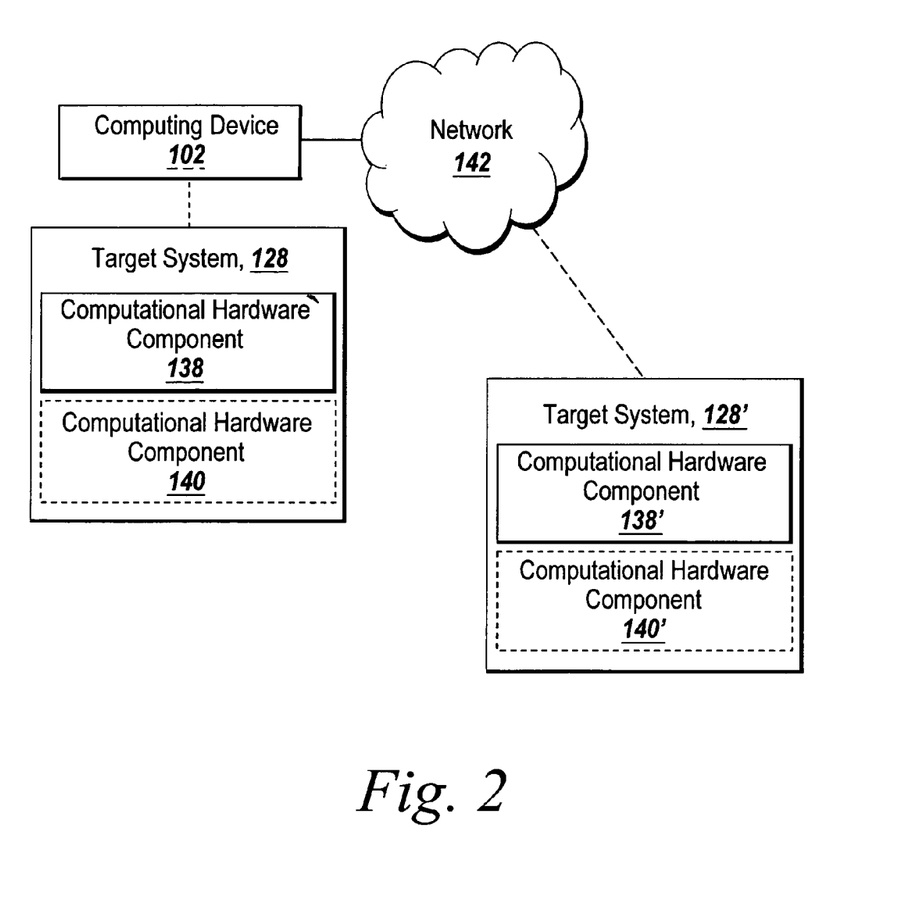
FIG. 2 is a block diagram of a system including two configurations that a computing device can communicate with a computational target platform that is suitable for practicing an embodiment of the present invention.

FIG. 2 illustrates a system that includes a computing device 102 communicating with a target system 128 and/or target system 128' according to one embodiment of the present invention. Computational device 102 communicates directly with target system 128 that has a first computational hardware component 138 and optionally a second computational hardware component 140. Computational device communicates with target system 128' via a network 142. Target system 128' has a first computational hardware component 138' and optionally a second computational hardware component 140'. Computational hardware component 138, 138', 140, 140' can be any one of a DSP, GPP, ASIC, ASIP, FPGA, and the like. Network 102 can be, but is not limited to, a LAN, WAN, wired or wireless network, or a combination thereof.

After computational device 102 has finished building an executable, it can be ported to the target system 128 directly, or to the target system 128' via network 102. The executable can be run using one or more computational hardware components. Since the executable is built using only the necessary source modules, it saves time to port the executable to either target system 128 or target system 128'. Additionally, target systems 128 and 128' need less memory to store the executable than if conventional build strategies were employed.

Figure 3:
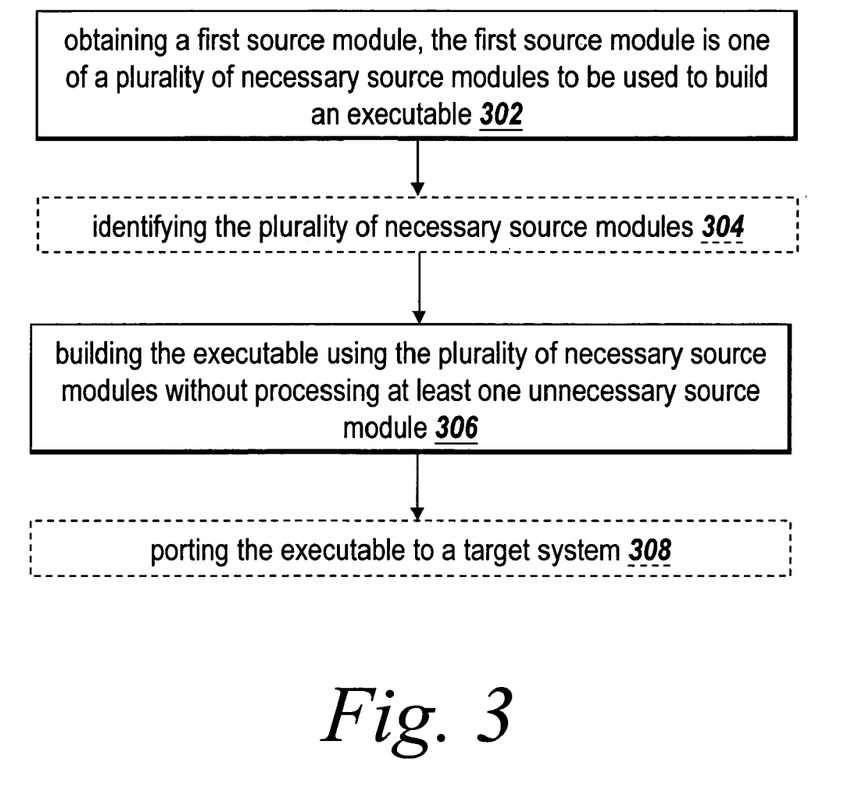
FIG. 3 illustrates a flowchart depicting steps taken to build an executable according to one embodiment of the present invention.

FIG. 3 illustrates a flowchart depicting steps taken to build an executable according to one embodiment of the present invention. In step 302, build tool 122 obtains a first source module, the first source module is one of the necessary source modules that are used to build an executable. In one embodiment of the present invention, the first source module can be a piece of code or file that is automatically generated. The first source module can also be a file that is written or generated in the C programming language or other programming language, such as the Python programming language, the MATLAB® programming language, the Verilog programming language, and the JAVA™ programming language. At least one of the necessary source modules can be part of the collection of source modules 124, such as a library, or a java .jar file. A library can be, but is not limited to, a file, a list of source modules/files, a directory, a set of directories, or a set of files of a certain type. Collection of source modules 124 can include other source modules that are unnecessary for building the executable. In step 304, Build tool 122 can optionally use minimal source tool 126 to determine and identify the necessary source modules (the details are discussed later). In step 306, build tool 122 builds the executable using the necessary source modules without processing the at least one unnecessary source module so that any of the unnecessary source modules that are included in collection of source modules 124 or other collections of source modules will not be used or processed in order to build the executable. As used herein, linking can be referred to, but is not limited to, the process of resolving unknown symbols by a linker, the process of connecting one source module with another so that one can use the resources and/or functionalities of another. In one preferred embodiment of the present invention, building the executable includes compiling the necessary source modules from the corresponding collection of source modules 124 without compiling any of the unnecessary source modules. Hence, only the compiled necessary source modules are used in the linking process and not the entire library. In one embodiment of the present invention, the source modules are files implemented in the C programming language, and the build tool 122 is a compiler that processes (compilation and linking) the source modules to build the executable. In step 308, the executable can be optionally ported to a target system, such as target system 128 or target system 128'. In one embodiment of the present invention, the executable is an .exe file.

Figure 4:
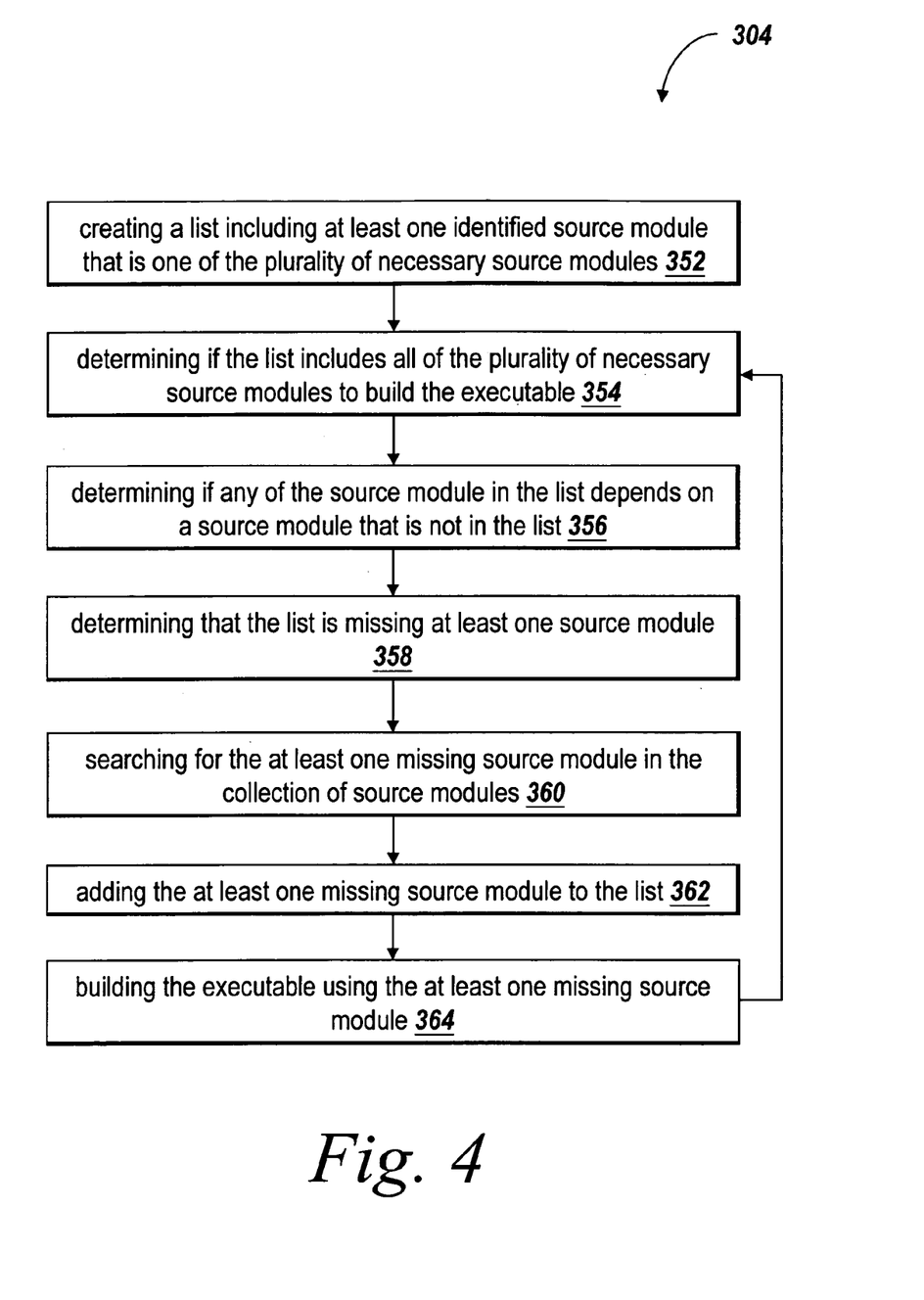
FIG. 4 illustrates a flowchart depicting steps taken to determine the necessary source modules to build an executable according to one embodiment of the present invention.

FIG. 4 illustrates a flowchart depicting steps taken to determine and identify the necessary source modules in step 304 to build an executable according to one embodiment of the present invention. In step 352, minimal source tool 126 creates a list including at least one identified source module that is one of the necessary source modules, such as first source module. The list can simply store the name of the source modules in a file. Alternatively, the list can be stored in temporary memory. One of ordinary skill in the art will appreciate that there are many ways to implement a list, and the examples given here are not meant to limit the present invention. In step 354, minimal source tool 126 determines if the list includes all the necessary source modules to build the executable. In one embodiment of the present invention, the minimal source tool 126 requests the build tool 122 to build the executable and if the executable can be built completely or successfully, then the minimal source tool 126 knows that the list of necessary source modules is complete. Alternatively, the minimal source tool 126 can first determine that the list is complete, then build tool 122 performs step 306 to build the executable. For example, the minimal source tool 126 can read each source module in the list and see if there is any source module missing and then obtain the missing source modules. If the minimal source tool 126 determines that the list is not complete, then minimal source tool 126 checks if the list includes any source module that depends on a source module that is not in the list in step 356. When minimal source tool 126 finds that the list includes a source module depend on a source module not in the list, the minimal source tool 126 determines that that list is missing the source module not in the list in step 358.

In step 360, the minimal source tool 126 searches for the missing source module in the collection of source modules 124 and/or other collections of source modules. When the missing source module is found, the missing source module is added to the list in step 362. For example, the first source module can depend on a second source module that is not in the list and is part of a collection of source modules 124. The minimal source tool 126 would search for the second source module in the collection of source modules 124 and possibly other collections of source modules. Once the minimal source tool 126 finds the second source module, the second source module is added to the list. In step 364, build tool 122 builds the executable using the missing source module that is now in the list and other source modules that are also newly added to the list. In one embodiment of the present invention, the source modules that are newly added to the list are the ones that have not been used to attempt to build the executable. The source modules that are newly added to the list are used by the build tool 122 to build the executable so that only the necessary source modules in the list are compiled and linked without compiling the entire collections of source modules that contains both the necessary source modules and other unused (unnecessary) source modules. For example, if library A only has one necessary source module, file1.c, then the file1.c file is used to build the executable, and only this file1.c file is compiled without compiling other source files in library A. Hence, time and memory are saved by not having to compile the entire library A to use file1.c. The minimal source tool 126 would then return to step 354 to determine if all the necessary source modules are included in the list. One of ordinary skill in the art will appreciate that step 304 may include one or more steps shown in FIG. 4 and the present invention is not limited to performing all the steps.

As an example, MATLAB® can automatically generate C code from .m files. These automatically generated C source files can be added to a minimal source list that maintains only the necessary source files. These automatically generated C source files are provided to a compiler (the equivalent of build tool 122) to generate object files. After the object files are created, a linker attempts to link these object files with each other without linking to any file that is not already in the minimal source list. In other words, if one of the object files depends on a source module (such as a C source file) in a library, it will not be linked if that source module is not listed in the minimal source list. In the prior art, when a source module from a library is needed to build an executable, all the source modules in the library needs to be compiled before linking of any source module in the library can take place. Hence, in the prior art, many unnecessary source modules are compiled in order to link the necessary source modules to build an executable. The present invention minimizes the number of source modules that need to be compiled before linking by only compiling the necessary source modules in a library and leaving the unnecessary source modules in the same library uncompiled. In one embodiment of the present invention, the library includes multiple C source files. The object files created from compiling the necessary source Modules are linked with other source modules in the minimal source list. In one embodiment of the present invention, build tool 122 or minimal source tool 126 checks and determines if an executable can be created, i.e. if the executable can be built. If the executable cannot be created, which can be signaled by the linker detecting one or more unresolved symbols, minimal source tool 126 searches in one or more libraries for any missing function or file that are used by the source files in the minimal source list. These missing files are then added to the list and compiled by the compiler. After compilation, the linker tries to link all the object files again. However, it is possible that the minimal source tool 126 was not able to find or identify all the necessary functions or files. Therefore, the minimal source tool 126 needs to again use the source files that are already in the minimal source list to find additional necessary source files until the minimal source list is complete and the linker does not find any unresolved symbols. In this manner, the executable is created with the necessary source files in the minimal source list and any unnecessary source file is excluded from the executable.

In another embodiment of the present invention, the compiler reads each automatically generated C source file and finds any function or file that is needed from a library. The compiler can then make a copy of only the source files needed from the library and compiles them with the automatically generated C source files. Some dependency source file may also be found by using the H include files that can be referenced in the C source files. Hence, the minimal source tool 126 does not need to repeat the process of searching for a necessary library function or file and then compiling the necessary library function or file to build the executable.

The present invention may also be applied to applications implemented using the JAVA™ programming language. For example, different packages and .jar files are often used to build a JAVA™ application or a JAVA™ archive, where many of the classes in the packages or binaries of the classes in the .jar file are not actually needed in the final product. A JAVA™ archive (.jar) can be created with a default runnable and only the binaries of the classes that are needed in the application. Additionally, only the classes that are needed to build the JAVA™ application or archive can be compiled and hence saving compilation and memory usage while building a JAVA™ application or archive.

The present invention is also applicable to graphical modeling environments, such as Simulink® from The MathWorks, Inc. of Natick Mass. Each of the blocks and elements in general in a graphical modeling environment is usually provided with all possible functions and features to let a user choose which function and/or feature to use, but the eventual model might not actually use all the functions and features that are provided with any block/element. Hence, when an executable is built from a graphical model or a block diagram model, it is not necessary to still include the unused functions and features. For example, Simulink® models include multiple blocks connected together. These blocks are drawn from a set of Simulink® Block Libraries and custom libraries that contain multiple blocks. In this example, the Simulink® blocks are analogous to source modules, and the Simulink® Block Libraries and custom libraries are analogous to the collection of source modules, such as source libraries. In the prior art, in order to port a Simulink® model to a different system, the entire Simulink® Block Library and custom libraries must be packaged with the model. Using the present invention, only the model blocks that are actually used would be packaged with the model.

In one aspect, the present invention may also be used to minimize/reduce the memory needed to load a model. In the prior art, no matter how many elements/blocks are used from a library or a Simulink® configurable subsystem, the entire library or all the possible options from the configurable subsystem are loaded into memory when a model needs to be loaded into memory. Hence, a lot of memory is used up for loading unused elements/blocks. The present invention enables application 120 not to load the entire library or configurable subsystem options when a model is loaded into memory. A configurable subsystem allows selection of one implementation of the subsystem from a list of options. The present invention allows only the selected options from the Simulink® configurable subsystem to be loaded into memory and to be compiled. In one aspect, the present invention can also load only the elements/blocks that are used in a model into memory. After application 120 receives an instruction for loading a model into memory, minimal source tool 126 can be used to identify the elements/blocks that are used in the model and search in the collection of source modules, such as a library, for the elements/blocks that are used in the model. Minimal source tool 126 can then provide application 120 with information about which element/block from which library is used in the model. In a preferred embodiment of the present invention, only the elements/blocks that are used in the model are identified from the library and loaded into memory. Hence, the present invention can have the advantage of not expending memory usage on loading the entire library that contains elements/blocks that are unused in the model. This way, memory is free up to perform other tasks and the time takes to load a model is shortened.

In one aspect, the present invention may also be used to minimize/reduce efforts in validating a model. In the prior art, because no matter how many elements/blocks are used from a library, the entire library is used by the model, it is time consuming for a user to validate the model as the user usually would need to validate all elements/blocks in the library, instead of just the elements/blocks that are used by the model. Although the user may go through the entire library and manually identify the elements/blocks that are used in the model to validate, such method is cumbersome and error prone. After application 120 obtains a model, minimal source tool 126 can be used to identify the elements/blocks that are used in the model and search in the collection of source modules, such as a library, for the elements/blocks that are used in the model. Minimal source tool 126 can then provide application 120 with information about which element/block from which library is used in the model. Application 120 can then create a new library containing the elements/blocks that are used by the model. In other words, in one aspect the present invention allows for the elements/blocks that are used from a library by a model to be saved separately to a new library such that the new library contains only those elements/blocks that are used by the model. This way, when functional validation of the model is performed, the minimum set of library elements/blocks on which the model is dependent is already identified and saved in the new library. Hence, time and effort are saved in validating a model using the present invention.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A computer-implemented method for building an executable using a set of source modules, said method comprising:
    obtaining from a user, through a user interface, a model;
    generating, using a processor of the computer, from the model a first source module, wherein the first source module is one of a plurality of necessary source modules to be used to build an executable, at least one of the plurality of necessary source modules comprising a part of a collection of source modules including at least one unnecessary source module that is not used in the executable;
    identifying the plurality of necessary source modules;
    creating a list including at least one identified source module that is one of the plurality of necessary source modules;
    building, using the processor of the computer, the executable using the plurality of necessary source modules without processing the at least one unnecessary source module in the collection of source modules, wherein building the executable comprises: compiling the plurality of necessary source modules without compiling the at least one unnecessary source module in the collection of source modules;
    and storing the executable in memory of the computer.

2. The method of claim 1, wherein the list includes the first source module.

3. The method of claim 2 further comprising:
    identifying that the first source module depends on a second source module that is not in the list, and;
    adding the second source module to the list.

4. The method of claim 1 further comprising:
    determining if the list includes all of the plurality of necessary source modules to build the executable.

5. The method of claim 4, wherein the step of determining includes:
    determining if any of the source module in the list depends on a source module that is not in the list.

6. The method of claim 4 further comprising:
    determining that the list is missing at least one source module;
    searching for the at least one missing source module in the collection of source modules; and
    adding the at least one missing source module to the list.

7. The method of claim 6 further comprising:
    building the executable using the at least one missing source module.

8. The method of claim 1, wherein the executable is one of an .exe file, a .class file, and a .jar file.

9. The method of claim 1 further comprising:
    porting the executable to a target system.

10. The method of claim 1, wherein the first source module represents an element in a graphical model.

11. The method of claim 10, wherein the graphical model is a block diagram model.

12. The method of claim 10, wherein the element is a block.

13. The method of claim 1, wherein the first source module is a file containing code written in the C programming language, the JAVA™ programming language, or a hardware description language.

14. The method of claim 1, wherein the collection of source modules is a library.

15. A computer-implemented method for building an executable using a set of source modules, said method comprising:
    obtaining from a user, through a user interface, a model;
    generating, using a processor of the computer, from the model a first source file, the first source file is one of a plurality of necessary source files to be used to build an executable, at least one of the plurality of necessary source files is from a library including at least one unnecessary source file that is not used in the executable;
    identifying the plurality of necessary source files;
    creating a list including at least one identified source file that is one of the plurality of necessary source files;

creating, using the processor of the computer, the executable using the plurality of necessary source files without the at least one unnecessary source file that is not used in the executable, wherein creating the executable comprises:
compiling the plurality of necessary source files without compiling the at least one unnecessary source files in the collection of source files; and
storing the executable in memory of the computer.

16. The method of claim 15, further comprising:
compiling all source files in the list, wherein the list does not include a second source file that the first source file depends on.

17. The method of claim 16 further comprising:
creating one or more object files;
linking the one or more object files; and
identifying an unresolved symbol.

18. The method of claim 17 further comprising:
searching for the unresolved symbol in the library;
identifying the second source file corresponding to the unresolved symbol, wherein the second source file is one of the files in the library; and
adding the second source file to the list.

19. The method of claim 18 further comprising:
compiling the second source file to create a second object file; and
linking the second object file with at least one of the one or more object files.

20. A computer-readable storage medium storing computer executable instructions for causing a computing device to build an executable using a set of source modules, said instructions comprise the instructions for:
obtaining from a user, through a user interface, a model;
generating from the model a first source module, the first source module is one of a plurality of necessary source modules to be used to build an executable, at least one of the plurality of necessary source modules is part of a collection of source modules including at least one unnecessary source module that is not used in the executable;
identifying the plurality of necessary source modules;
creating a list including at least one identified source module that is one of the plurality of
necessary source modules;
building the executable using the plurality of necessary source modules without processing the at least one unnecessary source module, wherein building the executable comprises:
compiling the plurality of necessary source modules without compiling the at least one unnecessary source module in the collection of source modules;
and storing the executable.

21. The medium of claim 20, wherein the list includes the first source module.

22. The medium of claim 21 further comprising the instructions for:
identifying that the first source module depends on a second source module that is not in the list, and;
adding the second source module to the list.

23. The medium of claim 20 further comprising the instruction for:
determining if the list includes all of the plurality of necessary source modules to build the executable.

24. The medium of claim 23 further comprising the instruction for:
determining if any of the source module in the list depends on a source module that is not in the list.

25. The medium of claim 23 further comprising the instructions for:
determining that the list is missing at least one source module;
searching for the at least one missing source module in the collection of source modules; and
adding the at least one missing source module to the list.

26. The medium of claim 25 further comprising the instruction for:
building the executable using the at least one missing source module.

27. The medium of claim 20, wherein the executable is an .exe file.

28. The medium of claim 20 further comprising the instruction for:
porting the executable to a target system.

29. The medium of claim 20, wherein the first source module is a file written in the C programming language.

30. The medium of claim 20, wherein the collection of source modules is a library.

31. A computer-readable storage medium storing computer-executable instruction for causing a computing device to build an executable using a set of source modules, said instructions comprise the instructions for:
obtaining from a user, through a user interface, a model;
generating from the model a first source file, the first source file is one of a plurality of necessary source files to be used to build an executable, at least one of the plurality of necessary source files is from a library including at least one unnecessary source file that is not used in the executable;
identifying the plurality of necessary source files;
creating a list including at least one identified source file that is one of the plurality of necessary source files;
creating, using the processor of the computer, the executable using the plurality of necessary source files without the at least one unnecessary source file that is not used in the executable, wherein creating the executable comprises:
compiling the plurality of necessary source files without compiling the at least one unnecessary source files in the collection of source files; and
storing the executable.

32. The medium of claim 31 further comprising the instruction for:
compiling all source files in the list, wherein the list does not include a second source file that the first source file depends on.

33. The medium of claim 32 further comprising the instructions for:
creating one or more object files;
linking the one or more object files; and
identifying an unresolved symbol.

34. The medium of claim 33 further comprising the instructions for:
searching for the unresolved symbol in the library;
identifying the second source file corresponding to the unresolved symbol, wherein the second source file is one of the files in the library; and
adding the second source file to the list.

35. The medium of claim 34 further comprising the instructions for:
compiling the second source file to create a second object file; and
linking the second object file with at least one of the one or more object files.

* * * * *

UNITED STATES PATENT AND TRADEMARK OFFICE
CERTIFICATE OF CORRECTION

PATENT NO. : 7,818,730 B1  
APPLICATION NO. : 11/479002  
DATED : October 19, 2010  
INVENTOR(S) : Anthony Robert Ryan et al.

Page 1 of 1

It is certified that error appears in the above-identified patent and that said Letters Patent is hereby corrected as shown below:

In the Specification:

At column 3, line 52, should read        instructions

At column 9, line 47, should read        needs

At column 11, line 18, should read       Freed

At column 11, line 19, should read       taken

In the Claims:

At column 12, line 29, should read       modules

At column 13, line 63, should read       modules

Signed and Sealed this  
Twelfth Day of July, 2011

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,818,730 B1 | Page 1 of 1 |
| APPLICATION NO. | : 11/479002 | |
| DATED | : October 19, 2010 | |
| INVENTOR(S) | : Anthony Robert Ryan et al. | |

It is certified that error appears in the above-identified patent and that said Letters Patent is hereby corrected as shown below:

On the Title Page, at Item (73) Assignee, replace "The Math Works, Inc." with --The MathWorks, Inc.--.

Signed and Sealed this
Ninth Day of December, 2014

Michelle K. Lee
*Deputy Director of the United States Patent and Trademark Office*